Patented Jan. 9, 1945

2,367,056

UNITED STATES PATENT OFFICE 2,367,056

SULPHONAMIDE DERIVATIVES OF 3-AMINO-5-METHYL-1,2,4-OXADIAZOLE AND PROCESSES FOR THEIR PRODUCTION

Richard O. Roblin, Jr., Old Greenwich, and Herman E. Faith, Stamford, Conn., assignors to American Cyanamid Company, New York, N. Y., a corporation of Maine No Drawing. Application July 31, 1942, Serial No. 453,102

9 Claims. (Cl. 260—239.6)

This invention relates to a new class of chemical compounds and methods for their preparation. More particularly it relates to the sulphonamide derivatives of 3-amino-5-methyl-1,2,4-oxadiazole.

This new class of chemical compounds may be represented by the following formula:

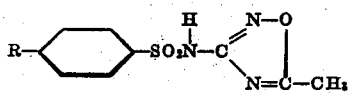

in which R represents an amino group or a group hydrolyzable to an amino group, including acyl amino groups of carboxylic acids.

Some of the compounds of this invention have bactericidal properties, and hence may be used for this purpose. They may also be used as intermediates for the preparation of other compounds, such as pharmaceuticals and particularly azo dyestuffs.

The compounds of the present invention, in general, may be prepared by reacting a p-acyl-aminobenzenesulphonyl halide with 3-amino-5-methyl-1,2,4-oxadiazole and such reaction products can then be converted into the compound of the general formula in which R is an amino group by hydrolysis. Preferably the reaction between 3-amino-5-methyl-1,2,4-oxadiazole and the sulphonyl halide is carried out in a medium comprising an organic liquid, such as acetone, isopropyl alcohol, tertiary butyl alcohol, dioxane, or the like. In the reaction a hydrogen halide is liberated and it may be desirable to provide a basic reaction medium which will react with the hydrogen halide evolved. This may be effected by carrying the reaction out in one of the organic solvents mentioned heretofore along with the addition of an excess of sodium hydroxide or other alkali metal hydroxide. Preferably the reaction is carried out in the presence of a basic reaction medium, such as pyridine, trimethylamine or quinoline, in which case it is not necessary to add an alkali hydroxide.

Our invention will be more fully described in conjunction with the following specific examples. It should be understood, however, that the examples are given by way of illustration only and the invention is not to be limited by the details set forth therein. Parts are by weight except in the case of liquids which are expressed in parts by volume.

Example 1

3 - acetylsulphanilamido - 5 - methyl - 1,2,4-oxadiazole is prepared by adding nine parts of acetylsulphanilyl chloride in several portions to a solution of 3.6 parts of 3-amino-5-methyl-1,2,4-oxadiazole in 11.5 parts of dry pyridine. The temperature of the resulting solution is maintained at 55° to 60° C. for three hours. The solution is then diluted with water and the precipitated solid is filtered off. This is stirred with dilute sodium hydroxide solution and the insoluble material filtered off. Neutralization of the filtrate gives 3-acetylsulphanilamido-5-methyl-1,2,4-oxadiazole.

The 3-amino-5-methyl-1,2,4-oxadiazole employed in the above example is a new chemical compound which we prepared by dissolving 25 parts of syrupy dioxyguanidine hydrobromide in 80 parts of glacial acetic acid. Then with cooling, 12 parts of sodium acetate and 33 parts of acetic anhydride were added. The suspension was stirred at room temperature for 12 hours, the solution filtered and the glacial acetic acid and acetic anhydride were removed by vacuum distillation. The viscous residue of diacetyl oxyguanidine is cooled and made alkaline with 40% aqueous sodium hydroxide. The alkaline solution is heated fifteen minutes over steam and the desired product is extracted with ether.

Example 2

3 - sulphanilamido - 5 - methyl - 1,2,4 - oxadiazole is prepared by refluxing 5.78 parts of the acetyl derivative from Example 1 with 70 parts of 10% hydrochloric acid solution for twenty minutes. During the last ten minutes, the solution is treated with decolorizing carbon. It is then filtered, cooled, and neutralized with sodium hydroxide to the point of maximum precipitation. The precipitated compound is purified by crystallizing from hot water or by reprecipitating from an alkaline solution.

In Example 1 above p-acetylaminobenzenesulphonyl chloride was used in carrying out the reaction. The acetyl compound is preferred because of its cheapness and availability. However, it is to be understood that p-acyl derivatives of any organic carboxylic acid may be used, including those such as the propionyl, butyryl, benzoyl, nicotinyl, and the like. Similarly, instead of the p-acetylaminobenzenesulphonyl chloride, the corresponding acetylaminobenzenesulphonyl bromide may be used.

When desired, the alkali metal, alkaline earth metal, or other metal salts of 3-sulphanilamido-5-methyl-1,2,4-oxadiazole may be prepared in accordance with the procedures normally employed for preparing salts of sulphonamides. The alkali metal and alkaline earth metal salts, for example, may be prepared by direct treatment with the appropriate alkali metal or alkaline earth metal hydroxide. The alkali metal salts may then, if desired, be converted into salts of the heavy metals, such as copper, iron, gold, etc., by treatment with water-soluble inorganic salts of the appropriate metal.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. Compounds of the group consisting of those represented by the following general formula and salts thereof:

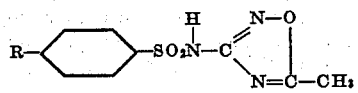

in which R is a member of the group consisting of amino radicals and acyl amino radicals.

2. The compound of 3-acetylsulpanilamido-5-methyl-1,2,4-oxadiazole.

3. The compound 3-sulphanilamido-5-methyl-1,2,4-oxadiazole.

4. The process which comprises reacting 3-amino-5-methyl-1,2,4-oxadiazole with a p-acylaminobenzenesulphonyl halide to give a 3-acylsulphonanilamido-5-methyl-1,2,4-oxadiazole.

5. The process which comprises reacting 3-amino-5-methyl-1,2,4-oxadiazole with a p-acylaminobenzenesulphonyl halide to give a 3-acylsulphanilamido - 5 - methyl-1,2,4-oxadiazole, and subsequently hydrolyzing to give 3-sulphanilamido-5-methyl-1,2,4-oxadiazole.

6. The process which comprises reacting 3-amino-5-methyl-1,2,4-oxadiazole with p-acetylaminobenzenesulphonyl chloride to give a 3-acetylsulphanilamido-5-methyl-1,2,4-oxadiazole.

7. The process which comprises reacting 3-amino-5-methyl-1,2,4-oxadiazole with p-acetylaminobenzenesulphonyl chloride to give 3-acetylsulphanilamido-5-methyl-1,2,4-oxadiazole, and subsequently hydrolyzing to give 3-sulphanilamido-5-methyl-1,2,4-oxadiazole.

8. The process which comprises hydrolyzing a 3 - acylsulphanilamido - 5 - methyl - 1,2,4 - oxadiazole to give 3-sulphanilamido-5-methyl-1,2,4-oxadiazole.

9. The process which comprises hydrolyzing 3-acetylsulphanilamido - 5 - methyl - 1,2,4 - oxadiazole to give 3-sulphanilamido-5-methyl-1,2,4-oxadiazole.

RICHARD O. ROBLIN, Jr.
HERMAN E. FAITH.